Nov. 13, 1945.            R. H. LACART ET AL            2,388,696
                            AUTOMATIC VALVE
                         Filed Jan. 2, 1942              2 Sheets-Sheet 1

Inventors:
Rollin H. Lacart,
Richard H. Gilbert,
Henry L. Beekley,
By Chritton, Wiles, Davies & Hirschl, Attys.

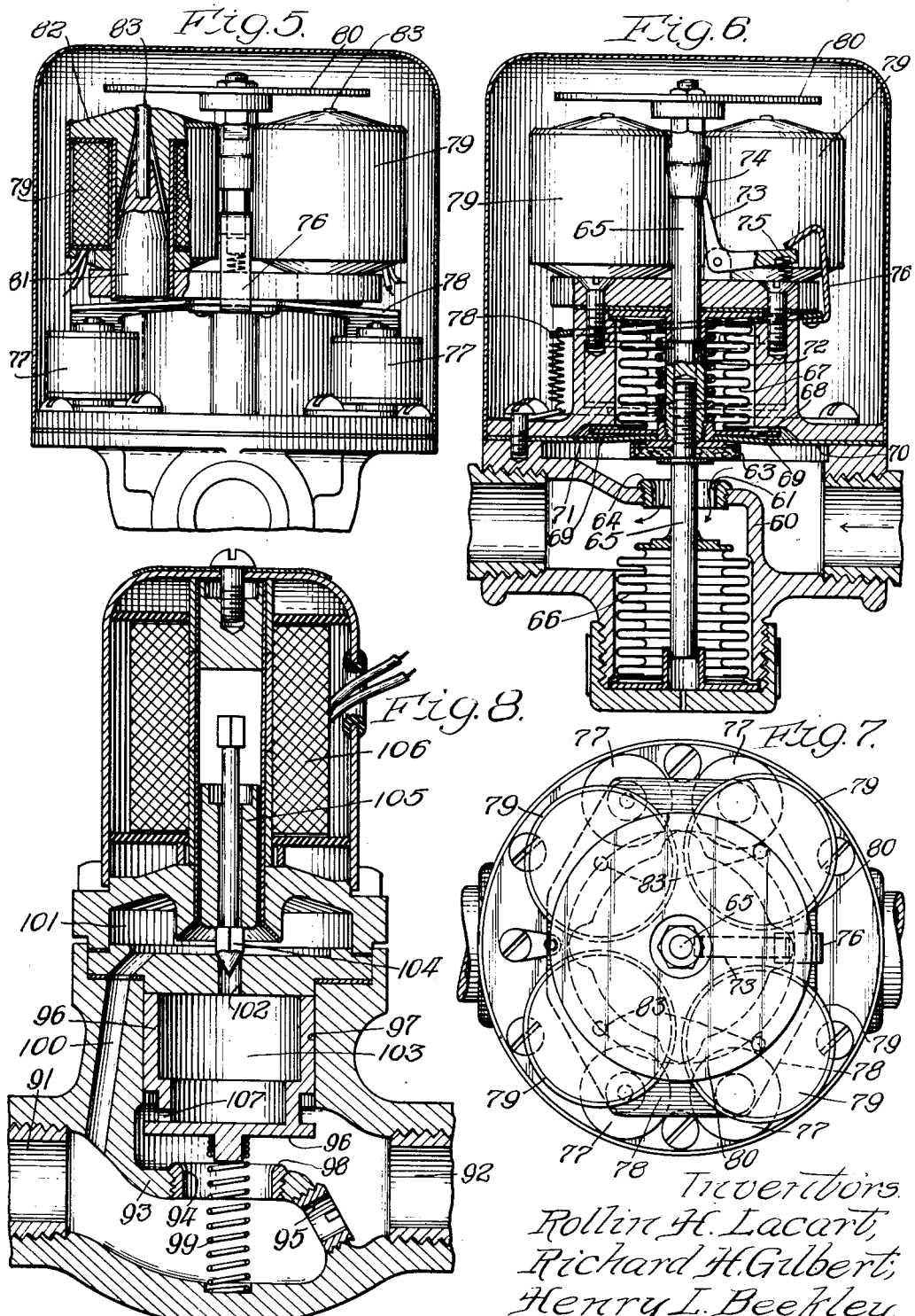

Patented Nov. 13, 1945

2,388,696

UNITED STATES PATENT OFFICE 2,388,696

AUTOMATIC VALVE

Rollin H. Lacart, Chicago, Richard H. Gilbert, Oak Park, and Henry L. Beekley, Glen Ellyn, Ill., assignors to The Electrimatic Corporation, a corporation of Illinois Application January 2, 1942, Serial No. 425,468

5 Claims. (Cl. 137—139)

Figure 1:
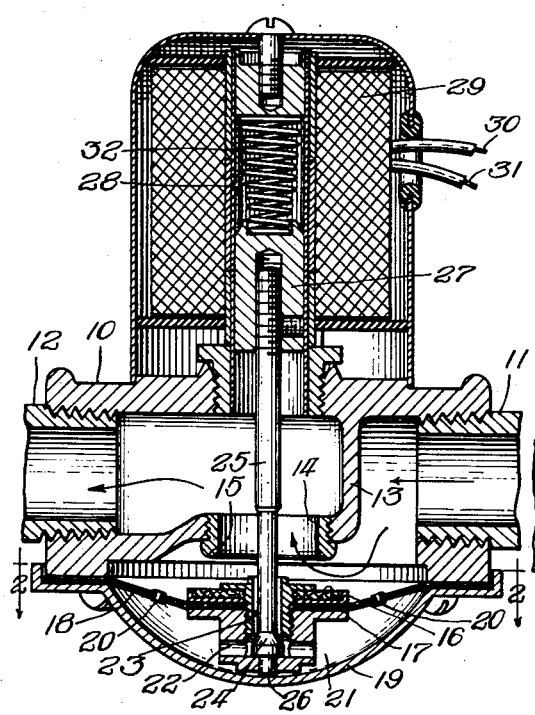
Figure 3:
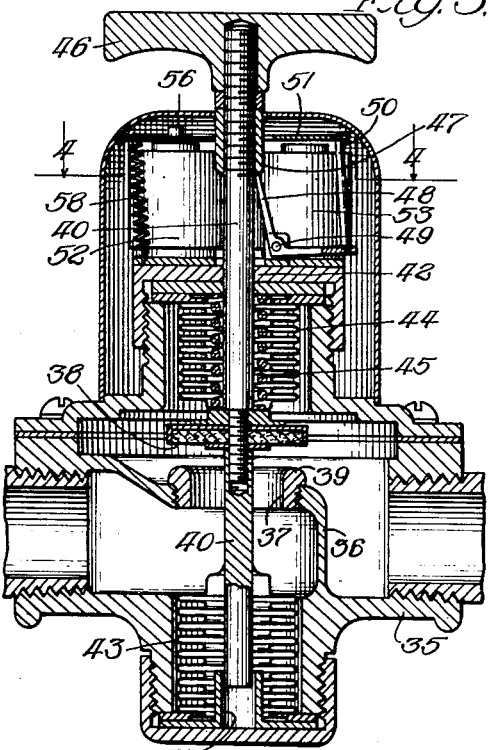
Figure 2:
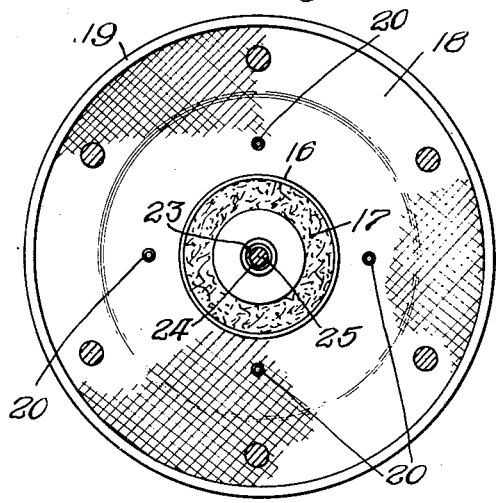
Figure 4:
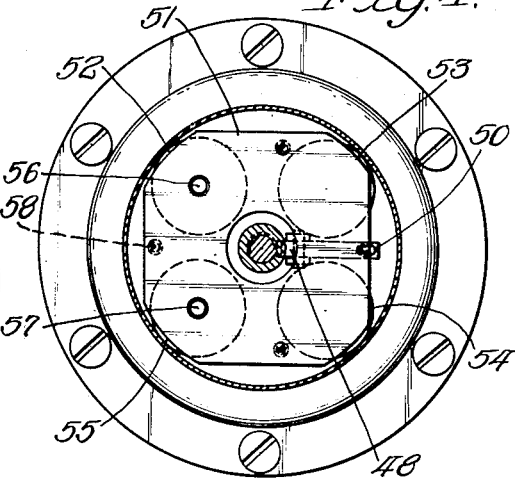

This invention relates to an automatic valve, and more particularly to various modifications of flow control valves for automatically completely shutting off or restricting flow of a fluid through the valve under certain conditions. One feature of this invention is that it provides an improved flow control valve; another feature of this invention is that it provides an improved electrically operated automatic valve; yet another feature of this invention is that at least some modifications of our valves are adapted to close off flow regardless of the presence or absence of fluid pressure in the flow path which they control; still another feature of this invention is that the valves provide protection against current failure, opening in such event; a further feature of our invention is the provision of a valve particularly designed to control flow of gasoline from a remote point, as where the valve is located adjacent a wing tank in an airplane and control is from the cockpit; yet a further feature of this invention is that one form of valve here disclosed can be both opened and closed electrically from a remote point with only a brief period of current energization; other features and advantages of this invention will be apparent from the following specification and the drawings, in which:

Figure 1 is a vertical sectional view of one form of electrically actuated automatic valve; Figure 2 is a transverse sectional view of such valve, along the line 2—2 of Figure 1; Figure 3 is a vertical sectional view of a modified form of flow control valve; Figure 4 is a transverse sectional view, along the line 4—4 of Figure 3; Figure 5 is a detail view, partly in section, of another form of flow control valve; Figure 6 is a vertical view, principally in section, of the device shown in Figure 5, the view of Figure 6 being transverse to that of Figure 5; Figure 7 is a top plan view of the valve shown in Figures 5 and 6, with the hood or casing removed; and Figure 8 is a vertical sectional view of still another form of valve.

Modern vehicles require an increasing use of flow control valves which must be automatic, capable of actuation from a remote point; and the use and control of such valves in rapidly moving vehicles with considerable amounts of vibration presents special problems. One instance of such use is in the control of gasoline flow from the various tanks of large airplanes. Modern multi-engine airplanes have tanks at various points in the wings and fuselage, and it is desirable to be able to control gasoline flow immediately adjacent the tanks. This presents a difficult problem, however, since the wing tank of a large airplane may be located a good many feet from the control point in the fuselage, at a place where it cannot be reached by hand at all; and both the valve and its control connections, electrical or otherwise, are subject to great vibration. Another instance of the use of flow control valves and vehicles is in the air conditioning of large busses or motor coaches. In such uses a valve must be provided to restrict the flow of refrigerant when desired, and problems of remote operation and of vibration are also present. We have developed and are here disclosing several forms of automatic valves which solve the problems incident to such uses.

In the particular embodiment of our invention illustrated in Figures 1 and 2 a flow control shut-off valve is shown particularly designed for shutting off flow of gasoline from an airplane tank, although it will be understood that it is also adapted to other uses. The valve shown is designed to operate at moderate pressures, up to about twenty-five pounds per square inch, and is not dependent on fluid pressure for its closing operation, although it is so arranged that any pressure on the inlet side assists closing of the valve when it is desired to shut off the flow of gasoline.

The device comprises a valve casing 10 having an inlet opening to which the pipe 11 is threadably connected, and an outlet opening to which the pipe 12 is connected, these being separated by a partition 13 having a control opening 14 therethrough, this opening having an annular seat 15 on its lower side. The valve member adapted to control flow through the opening 14 comprises a cup 16 having a gasket 17 therein adapted to cooperate with the seat 15. The valve member is centrally fastened in a flexible diaphragm 18 of pliant material, as treated cloth impervious to gasoline, this diaphragm being clamped to the housing at its periphery by the bottom closure member 19, and being provided with four bleeder openings here provided by the center passageways in four rivets 20, through the diaphragm material.

The diaphragm and housing member 19 provide a chamber 21 at the bottom of the valve, this chamber communicating with liquid on the inlet side through the bleeder openings and the rivets 20, and communicating with the opening 14 through openings 22 connecting with the opening 23. This latter opening is controlled by a pilot valve 24 carried by a rod 25 guided at its lower end by a guide bushing 26 and carrying a solenoid plunger 27 at its upper end. This plunger is vertically reicprocable in a tube 28 of non-magnetic, non-corrosive material, within a solenoid 29 adapted to be energized through the leads 30 and 31, the plunger being normally urged toward the position shown by a spring 32.

When there is no current present in the solenoid, the normal condition, the spring 32 pushes the solenoid plunger, rod, and pilot valve to the position shown in Figure 1, opening the pilot passage 23 and permitting fluid in the chamber 21 to escape to the outlet side of the valve, the spring also mechanically forcing the valve member away from the opening 14. This causes the valve to stay open and to permit gasoline, for example, to flow through it. When it is desired to shut off the flow of gasoline at the tank, however, it is only necessary to energize the circuit including the wires 30 and 31, whereupon the solenoid causes the plunger 27 to move up against the resistance of the spring 32. The solenoid is designed with sufficient strength to move the valve member mechanically to closed position if there is no longer any fluid pressure on the inlet side of the valve; but if there is fluid pressure it assists the closing operation. It will be seen that as soon as the pilot passage 23 is closed any pressure in the inlet side of the valve tends to create an equal pressure in the chamber 21 beneath the diaphragm 18, and this pressure is effective over the entire lower area of the diaphragm, whereas flow through the opening 14 results in a reduced pressure on the upper portion of the diaphragm immediately beneath the opening. There is thus a pressure differential which tends to cause the valve member to move up to closed position. This is a relatively simple valve which has proved very effective for the uses for which it has been designed.

The previously described valve, however, requires that the circuit to the solenoid be maintained energized as long as it is desired to keep the valve closed, and this is sometimes undesirable. Fire, damage from anti-aircraft or other shells, or the like may result in the circuit to the control solenoid being opened after the pilot or other operator has consciously shut off the flow of gasoline from a given tank. In order to provide a valve which requires only a brief energization of its electrical actuating means to close it, and which then remains closed regardless of maintenance of the circuit, we have designed the valve shown in Figures 3 and 4. In this valve the casing 35 again has its inlet and outlet separated by a partition 36 having a flow control opening 37 therethrough. The valve member, and more particularly the gasket 38, is adapted to cooperate with an annular seat 39 to close the opening and block flow through the valve when desired. The valve member is carried on a rod 40 longitudinally movable in guides 41 and 42, this rod being made in two parts for convenience of assembly, these being liquid sealed at the lower end by the Sylphon 43 and at the upper end by the Sylphon 44.

A spring 45 normally urges the valve member to closed position, the rod being provided at its upper end with a handle 46 to enable the rod to be lifted upwardly to move the valve to open position. When the rod has been manually pulled up to open position it is retained in this position by the latching engagement between a collar 47 on the rod and a latching member 48 pivotally mounted at 49, the latching member being in the form of a bell crank. A push rod 50 operates on its lower end to move the latching member to unlatching position whenever the armature plate 51 is pulled down by the magnets 52, 53, 54 and 55. The magnets 55 and 52 are provided with central pins 56 and 57 extending up through cooperating openings in the armature plate, providing hinge points for the movement of such plate. Tension springs, as 58, pull on the back end of the plate to keep the forward or latch-operating end normally up; and downward movement of the forward end of the plate to effect unlatching and closing of the valve results from energization of the coils of the magnets 52, 53, 54 and 55. The magnets are preferably independently wired to the control point, with their wires following different paths, so that the valve may be closed even though one or two wires have been severed. That is, with an arrangement of this kind the valve can be closed if any two of the four magnets are operative, provided only that one is a back or pin-carrying magnet. Where such a valve is used in an airplane wing tank, for example, it would be pulled to open position before the flight started, and flow of gasoline from the tank controlled by a regular manually controllable valve in the cockpit. In the event of any damage or other reason for terminating flow at the tank, however, it would only be necessary to momentarily close the magnet circuits to cause the valve shown to operate to shut off the flow.

The modified form of valve shown in Figures 5, 6 and 7 is an improved fully automatic valve particularly adapted for use on very large bombers or airplanes, this valve being so arranged that it may be both opened and closed electrically from a remote point, with only a brief energization of the control circuit, so that complete control of gasoline flow from a wing tank may be had at a point adjacent that tank from a remote point, as the cockpit. The actual fluid control arrangement in the valve which we are now describing is similar to that previously described, a partition 60 separating the inlet and outlet and providing communication therebetween through a control opening 61, flow through this opening being adapted to be closed off whenever the gasket 62 in the valve member or valve cup 63 contacts the annular seat 64. The valve member is again carried on a longitudinally movable rod 65, appropriately guided for vertical movement, and sealed at the lower end by the Sylphon 66 and at the upper end by the Sylphon 67. It will be noted that the diameter across the outer surfaces of the inner convolutions of the Sylphon is the same as the diameter of the crown of the annular seat 64, this compensating for any differences in pressure in the fluid and balancing out the effects of such pressure differences, so that the force necessary to open and close the valve always remains the same.

The rod 65 carries, immediately below the Sylphon 67, a metal plate 68 adapted to cooperate with openings 69 in a diaphragm 70, this diaphragm also being provided with another opening 71 lying just beyond the edge of the plate 68. These cooperate to provide a dashpot action which considerably restricts downward or closing movement of the valve, but only slightly restricts upward movement thereof, it being desired to have upward movement as free as possible. When the valve is open, as shown, it is obvious that if it starts to move to closed position pressure beneath the diaphragm will force it up into contact with the plate 68, and this will close the openings 69, so that downward movement of the valve to closed position will be a function of the rate of flow of liquid through the single bleeder opening 71. When the valve is being moved toward open position, however, the plate will tend to pull away from the diaphragm and uncover the four openings 69, so that fluid can flow through five openings to permit the upward movement to be rapid.

The rod 65 and the valve member and other parts carried by it are normally urged toward closed position by the spring 72, but are adapted to be latched in open position by cooperation between the upper end of the latching member 73 and the edge of the collar 74 near the upper end of the rod 65. When the parts are latched in open position, as shown in the figures, a small spring 75 holds the latch member in latched position until it is forcibly pulled down by the member 76, controlled by the action of the magnets 77. These magnets are arranged at the corners of a rectangle, and cooperate with an armature plate 78, the arrangement of these magnets and the armature plate being analogous to that described in connection with the preceding modification. That is, the plate is pivotal about pins in the center of two of the magnets, and adapted to have its forward end carrying the member 76 pulled down by energization of any two of the four magnets, provided only that one of them be a back magnet. When the valve is in open or latched position, therefore, it moves to closed position in the same manner as the valves previously described and shown in Figures 3 and 4.

Opening movement of the valve now being described, however, is not effected manually, but electrically. Four solenoids 79 are provided with identical plunger arrangements adapted to cooperate to operate against a pressure plate 80 to move the valve to open position. Inasmuch as the arrangement of the opening solenoids is identical, only one will be described in detail, reference being had particularly to Figure 5. Each solenoid is provided with a solenoid plunger 81, preferably tapered and adapted to cooperate with a tapered solenoid core 82 to increase the pull, and carries a pin 83 adapted to extend up through an opening in the top of the solenoid and bear against the pressure plate when the solenoids are energized. When the valve is in latched position the parts are as shown in the drawings, but if the valve were closed the pressure plate 80 would, of course, lie immediately adjacent the top of the solenoids; and the energization of the solenoids, by moving the plungers and pins upwardly, would force the plate 80 (and thus the rod 65 and the parts which it carries) back up to the position shown in the drawings, where the valve would be latched open. Again it will be obvious that opening movement of the valve can be effected without the necessity of all of the solenoids being operative, less than the full number being capable of effecting the desired upward movement of the pressure plate.

The valve which we show in Figure 8 has been particularly designed for control of refrigerant flow in a motor bus or motor coach employing a rotary pump to circulate the refrigerant. Here the valve casing 90 has its inlet 91 separated from its outlet 92 by a partition 93 having a control opening 94 therethrough, the partition also being provided with another fixed, uncontrolled opening 95. That is, the opening 95 always permits a certain minimum flow of refrigerant, depending upon its size, particularly important where damage to a rotary pump is to be prevented; and the main control opening 94 permits the principal portion of refrigerant flow to be blocked when desired. This blocking is accomplished by a valve plunger 96 reciprocable in a cylinder 97 and adapted to close off flow, when desired, by moving into contact with the annular seat 98 surrounding the control opening 94.

The valve member piston 96 is normally urged toward open position, as shown, by the spring 99, but is adapted to be moved to closed position by fluid pressure. A passage 100 leads from the inlet side of the valve to a chamber 101 in the upper part, where fluid under pressure can be delivered through an opening 102 to the chamber 103 whenever the pilot valve 104 is open. Opening movement of the pilot valve is effected by upward movement of a solenoid plunger 105 upon energization of the solenoid 106, the valve and plunger being in the position shown when the solenoid is not energized.

The chamber 103 within the valve piston communicates with the outlet side of the valve through a bleeder opening 107, this opening being smaller than either the opening 102 or the passage 100, so that when the pilot valve 104 is open fluid is delivered to the interior of the piston member, the chamber 103, faster than it can escape therefrom through the bleeder opening 107. Under such circumstances the fluid pressure within the piston member overcomes the mechanical pressure of the spring 99 and moves the valve to closed position, restricting the flow of refrigerant to the small amount passing through the fixed opening 95; whenever the pilot valve 104 closes the opening 102, however, pressure within the chamber 103 bleeds out through the opening 107 and the spring 99 moves the valve piston to open position, as shown. In order that this operation may be effectively obtained the fitting between the valve piston and its cylinder must be particularly close. The fact that this valve has its main orifice open when the current is off makes it very desirable for the use disclosed, where vibration of the vehicle is likely to cause damage to the thermostat or some other portion of the electrical control system. With a valve of this type the cooling system is operative if there should be any failure, and a manual flow control valve can be provided somewhere else in the system to restrict its operation to less than full value if desired; whereas with previous valves failure of the electrical control system resulted in complete failure of the air conditioning system.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. A valve of the character described for controlling fluid flow, including: a casing having an inlet passageway and an outlet passageway separated by a partition having an opening therein; a seat around said opening; a valve member movable toward and away from said seat to control flow through said opening; a chamber in said casing adapted to be in communication with one of said passageways; a diaphragm member open to the pressure in the chamber and connected to the valve member; and a plate member adjacent the diaphragm, the plate member being movable with the valve member and adapted to have at least a portion thereof engage the diaphragm during closing movement of the valve member, the diaphragm having at least one opening therethrough within the area of engagement of the plate member.

2. A valve of the character described for controlling fluid flow, including: a casing having an inlet passageway and an outlet passageway separated by a partition having an opening therein; a seat around said opening; a valve member movable toward and away from said seat to control flow through said opening; a chamber in said casing adapted to be in communication with one of said passageways; a diaphragm member having one side open to the pressure in the chamber and the other side open to the inlet pressure, this member being connected to the valve member; and a plate member adjacent the diaphragm, the plate member being movable with the valve member and adapted to have at least a portion thereof engage the diaphragm during closing movement of the valve member, the diaphragm having at least one opening therethrough within the area of engagement of the plate member, there being means for permitting restricted flow of fluid into said chamber after said engagement.

3. A valve of the character described for controlling fluid flow, including: a casing having an inlet and an outlet separated by a partition having an opening therein; a seat around said opening; a valve member movable toward and away from said seat to control flow through said opening; a spring for urging the valve member toward the seat; electrically actuated means for effecting movement of said valve member away from said seat, against the urging of said spring; means for latching the valve member in a position spaced from the seat to permit flow through the opening; separate electrically actuated means for unlatching the member, whereby the spring moves it against the seat to block flow through said opening; a plate movable with the valve member; and a diaphragm adjacent the plate having at least one opening within the area of the plate and at least one outside of such area, the arrangement being such that the plate blocks fluid flow through the diaphragm opening within its area during movement of the valve member toward the seat to retard such movement.

4. A valve of the character described for controlling fluid flow, including: a casing having an inlet and an outlet separated by a partition having an opening therein; a seat around said opening; a valve member movable toward and away from said seat to control flow through said opening; sealing means so arranged that variations in pressure in the fluid admitted to the valve are balanced in effect upon the valve member and sealing means; a spring for urging the valve member toward the seat; electrically actuated means for effecting movement of said valve member away from said seat, against the urging of said spring; means for latching the valve member in a position spaced from the seat to permit flow through the opening; and separate electrically actuated means for unlatching the member, whereby the spring moves it against the seat to block flow through said opening.

5. A valve of the character described for controlling fluid flow, including: a casing having an inlet and an outlet separated by a partition having an opening therein; a seat around said opening; a valve member movable toward and away from said seat to control flow through said opening; a longitudinally movable rod carrying the valve member; a Sylphon seal between one end of the rod and the casing, the diameter of the outer surfaces of the inner convolutions of the Sylphon being equal to the diameter of the seat where it is engaged by the valve member; a spring for urging the valve member toward the seat; electrically actuated means for effecting movement of said valve member away from said seat, against the urging of said spring; means for latching the valve member in a position spaced from the seat to permit flow through the opening; and separate electrically actuated means for unlatching the member, whereby the spring moves it against the seat to block flow through said opening.

ROLLIN H. LACART.
RICHARD H. GILBERT.
HENRY L. BEEKLEY.